(12) United States Patent
Uhl et al.

(10) Patent No.: US 8,287,001 B2
(45) Date of Patent: Oct. 16, 2012

(54) RELEASING MUD FLAP HANGER

(75) Inventors: Michael C. Uhl, Holland, OH (US); Albert L. Mackey, Swanton, OH (US)

(73) Assignee: Slip-Flap, Inc., Holland, OH (US)

(*) Notice: Subject to any disclaimer, the term of this patent is extended or adjusted under 35 U.S.C. 154(b) by 546 days.

(21) Appl. No.: 12/586,550

(22) Filed: Sep. 24, 2009

(65) Prior Publication Data

US 2010/0096523 A1 Apr. 22, 2010

Related U.S. Application Data

(60) Provisional application No. 61/196,873, filed on Oct. 21, 2008.

(51) Int. Cl.
*B62D 25/18* (2006.01)

(52) U.S. Cl. ... 280/851; 280/154; 280/847; 280/152.05; 280/848

(58) Field of Classification Search ............ 280/851, 280/154, 847, 152.05, 848; 248/289.31, 248/292.11
See application file for complete search history.

(56) References Cited

U.S. PATENT DOCUMENTS

| | | | | |
|---|---|---|---|---|
| 3,700,260 A * | 10/1972 | Moore et al. | | 280/851 |
| 3,737,176 A * | 6/1973 | Cobb | | 280/851 |
| 3,778,086 A * | 12/1973 | Moore et al. | | 280/851 |
| 4,421,333 A * | 12/1983 | Van Dyke | | 280/851 |
| 4,572,532 A * | 2/1986 | Early et al. | | 280/851 |
| 4,817,976 A * | 4/1989 | Kingsley | | 280/154 |
| 6,116,628 A * | 9/2000 | Adrian | | 280/154 |
| 6,994,376 B1 * | 2/2006 | Deering et al. | | 280/847 |
| 7,226,086 B2 * | 6/2007 | Haynes | | 280/851 |
| 2005/0110266 A1 * | 5/2005 | Barr et al. | | 280/847 |

* cited by examiner

*Primary Examiner* — Terrell McKinnon
*Assistant Examiner* — Michael McDuffie
(74) *Attorney, Agent, or Firm* — Emch, Schaffer, Schaub & Porcello Co. LPA

(57) ABSTRACT

A releasing hanger for mud flaps for trucks includes a rotatable release bar supported on a support plate and having flap lugs for supporting a mud flap. A tension spring encircling the release bar cooperates with retaining pins mounted on the releasing bar to yieldingly hold the release bar in a rotatable position at which the flap legs extend outwardly from the support plate. Under a modified embodiment, the retaining pins are releasably held by a bracket having resilient legs.

16 Claims, 12 Drawing Sheets

RELEASING MUD FLAP HANGER

CROSS REFERENCE

This application is based upon and claims the benefit of U.S. provisional patent application No. 61/196,873 filed Oct. 21, 2008.

The present invention is directed to a releasing hanger for mud flaps for trucks.

BACKGROUND OF THE INVENTION

All commercial trucks, tractors and trailers are equipped with mud flaps which are mounted behind the tires to mitigate the spray effect on wet roads and to prevent the ejection of stones and road debris. Mud flaps normally measure 24 inches wide and generally extend from above the tire to approximately 5 inches above the road.

Presently mud flaps are attached to a bracket by means of bolts. Mud flap damage occurs most often when the flap becomes lodged between the tire and the driving surface. This can occur when the equipment is in reverse on an unstable surface or when the truck encounters debris or other obstruction on the driving surface such as parking bumpers. Once the flap is lodged under the tire, either the flap is torn from the bracket or the bracket is broken from its mounting.

All trucks fall under the jurisdiction of both state and federal departments of transportation. All trucks are required to maintain mud-flaps and it is illegal to drive on a roadway without one. While the cost of mud flap is minimal, generally between five and twenty five dollars, the cost of replacing a mud flap is much more expensive than the cost of the mud flap.

Generally drivers do not carry replacement mud flaps nor the tools necessary to replace them. This means that a service call can be necessary to replace a mud flap, with the normal cost of a service call running between one and two hundred dollars. If the truck is able to navigate the roadways legally to replace a mud flap, it will entail out of route miles. Routing to a repair facility will generally add at least twenty-five miles to the scheduled route. The cost of operating a truck/trailer combination averages in excess of one dollar per mile.

If a truck is discovered to have missing or faulty mud flaps by any law enforcement agencies or the department of transportation, it is possible that the truck will be put out of service at that location until arrangements have been made to repair the mud flap on the road.

In addition all interstate carriers are governed by the Interstate Commerce Commission and as part of that governance, the government maintains Safe Stat statistics on each carrier, which utilize the information generated from roadside and weigh scale inspections. Missing or damaged mud flaps will generate a negative finding and adverse impact on the Safe Stat numbers. These numbers are extremely important to a trucking company as they are given a major weighting in the determination of insurance rates.

Trucks also run a liability risk if improper mud flaps cause road debris or stones to impact other vehicles.

The other major cost to mud flap failures is the time to repair. Under DOT regulations, a driver is limited on the number of hours worked in a day and aggregate hours worked in a seven or eight day period. Time spent in having a mud flap repaired or replaced is counted against the allowable hours worked in any one day or seven day period. The average revenue lost due to one hour of waiting for a repair is $87.50. Repairs can easily take two or three hours. While on average, trucks and trailers lose several flaps in a year, and in some applications may lose up to that many in a week, the cost of a slip flap bracket would be less than the loss of one hour's revenue.

Accordingly, it is important to be able to immediately and easily replace the mud flap in order to minimize the length of time the semi tractor and trailer are delayed from proceeding.

A number of prior art mud flap holders and mounting systems have been patented including U.S. Pat. Nos. 5,044,667; 7,040,662; and 7,226,086. However, it does not appear that any of these has gained wide spread use. Some of the prior art mud flap holders have moldable parts which can be lost or damaged when the mud flap is violently torn therefrom while others require a mud flap having enlargements or other configurations different from the standard mud flaps which have parallel front or back surfaces such that the mud flap has a substantially uniform thickness. It is unlikely that truck stops would be willing to stock mud flaps having configurations other than ones with a uniform thickness between the front and rear panels.

SUMMARY OF THE INVENTION

The present invention is directed to a toggle bracket for holding mud flaps for trucks and trailers. The bracket of the present invention has a releasing mechanism that permits the rapid replacement of a mud flap which has been released from a truck or trailer. It uses a set of lugs on a bar that are maintained in a horizontal position by means of a two torsion springs or under another embodiment, by means of a snap-in holder. The releasing mechanism is adequate to maintain the flap in place through any driving conditions that may be encountered but allows release of a flap lodged under a tire before any damage is done to the flap, the holding device or any brackets.

Other objects and advantages of the present invention will become apparent to those skilled in the art upon a review of the following detailed description of the preferred embodiments and the accompanying drawings.

IN THE DRAWINGS

FIG. 1 is a front view of the hanger with the mud flap in place held by the flap lugs and retained by the cover.

FIG. 2 is a front view illustrating the mechanism without the cover. There is a release bar with the flap lugs and retaining pins that set on the pin rests. In this view, the flap lugs are held by the springs in a horizontal position for flap installation.

Figure 6:
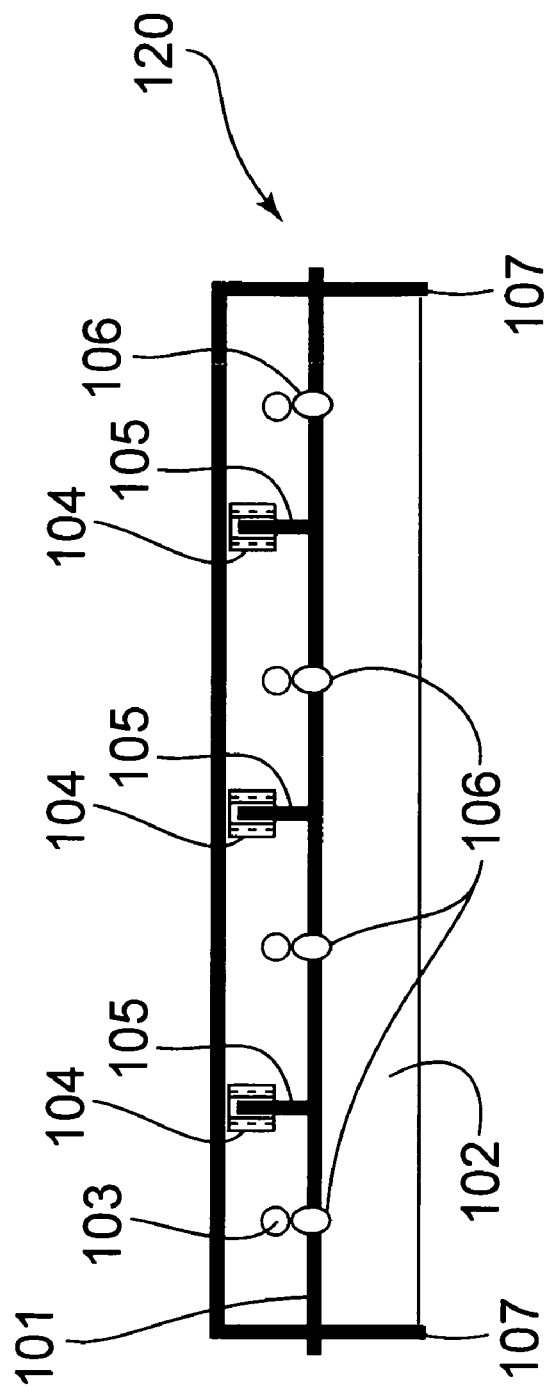

FIG. 6 is a front view illustrating a modified embodiment of mud flap hanger without the cover. There is a center bar with the flap lugs and retaining pins along with the pin brackets. In this view, the retaining pins are locked for flap installation.

Figure 7:
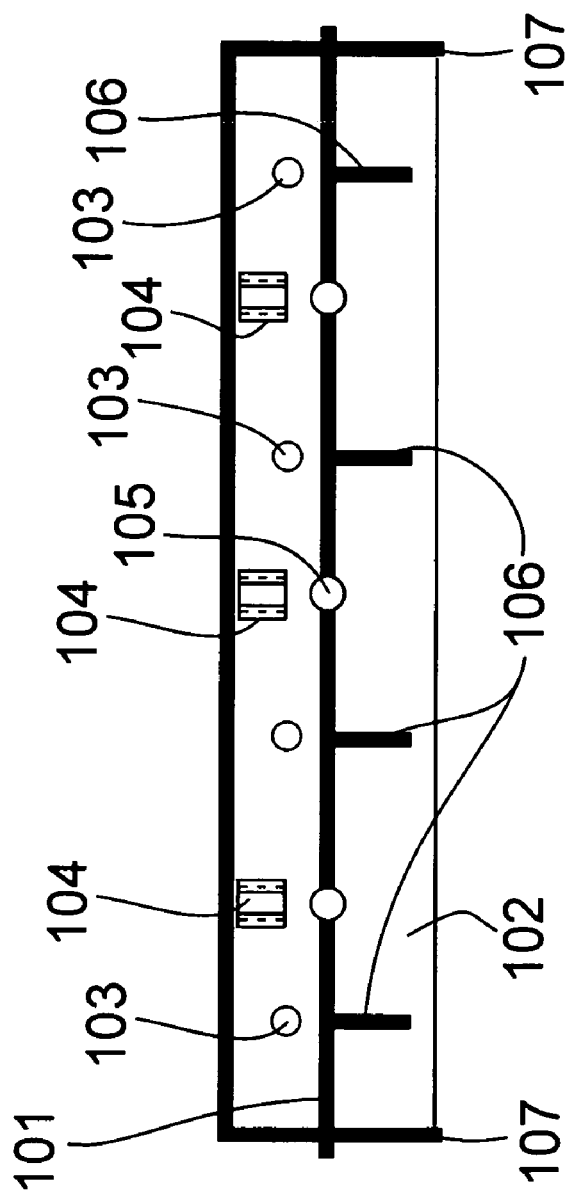

FIG. 7 is a view similar to FIG. 6 which shows the hanger after the retaining pins have been released from the pin brackets.

Figure 8:
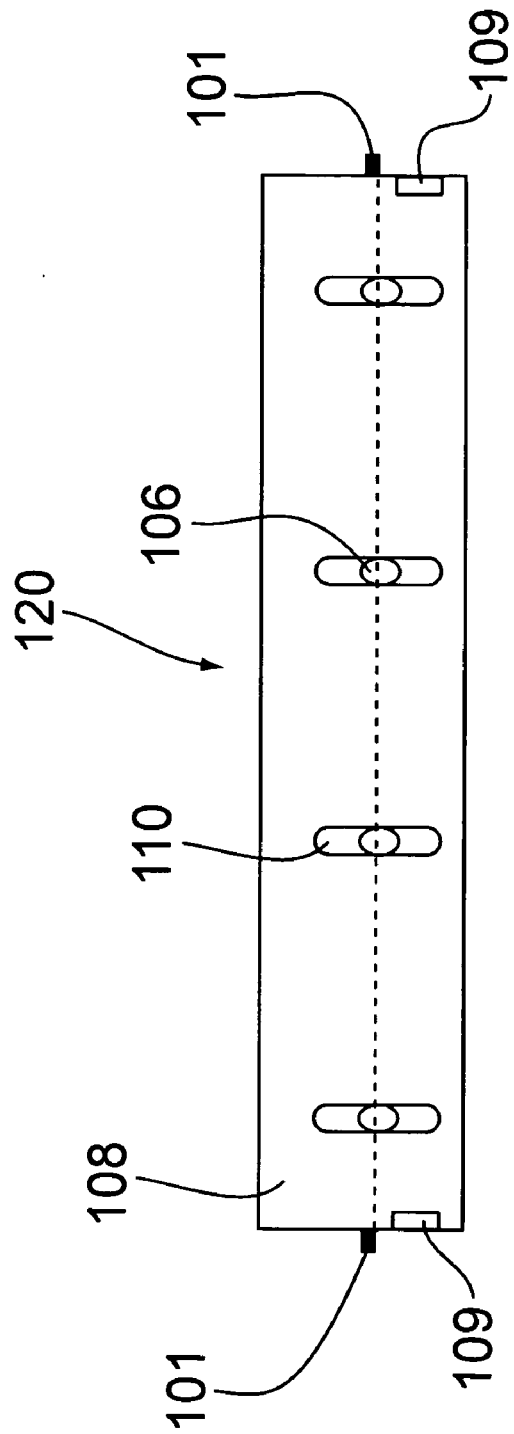

FIG. 8 is a front view of the modified embodiment with the cover and showing the flap lugs extended.

Figure 9:
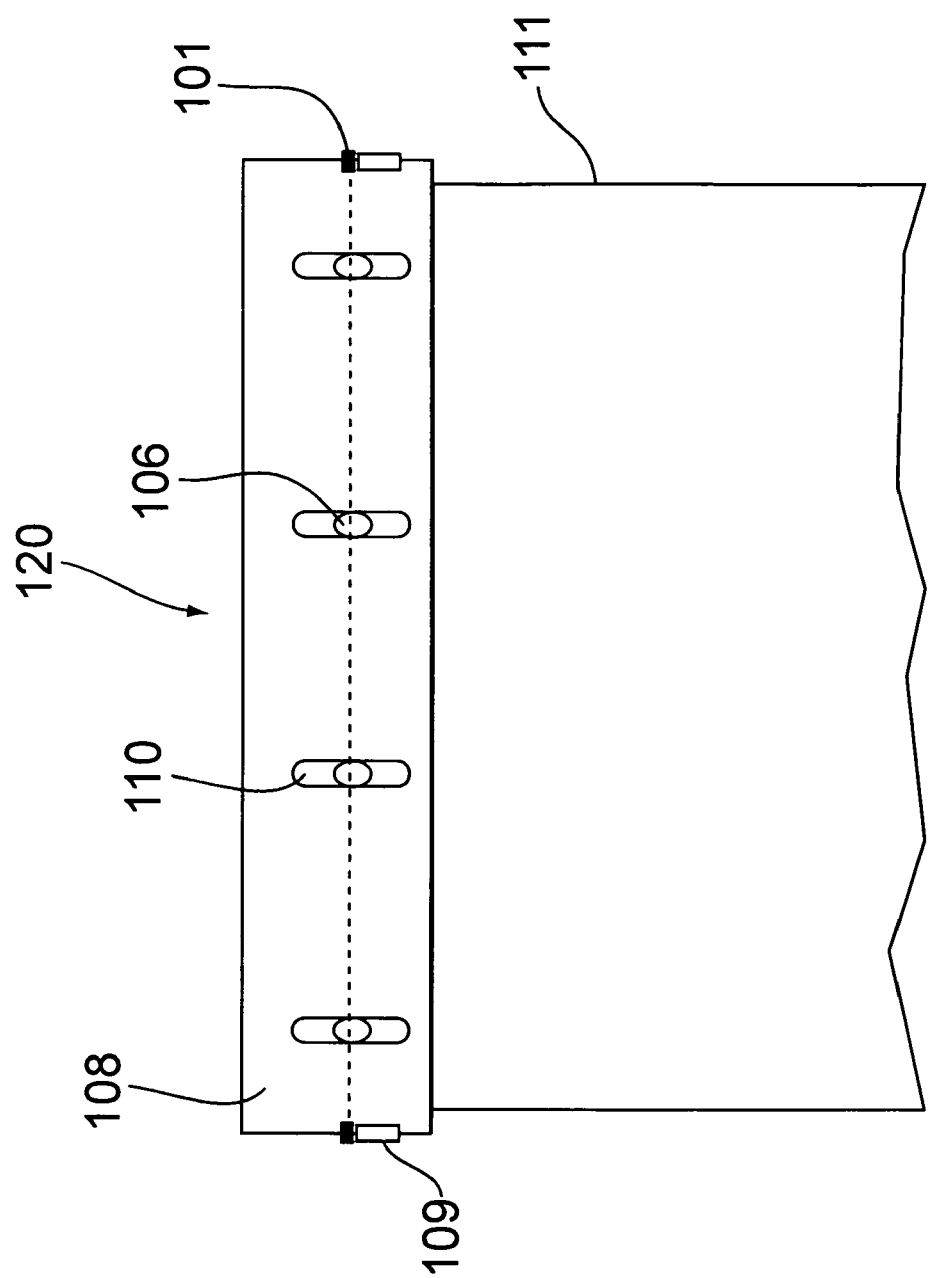

FIG. 9 is a front view of the modified embodiment with the mud flap in place, held by the flap lugs, with the cover closed.

Figure 10:
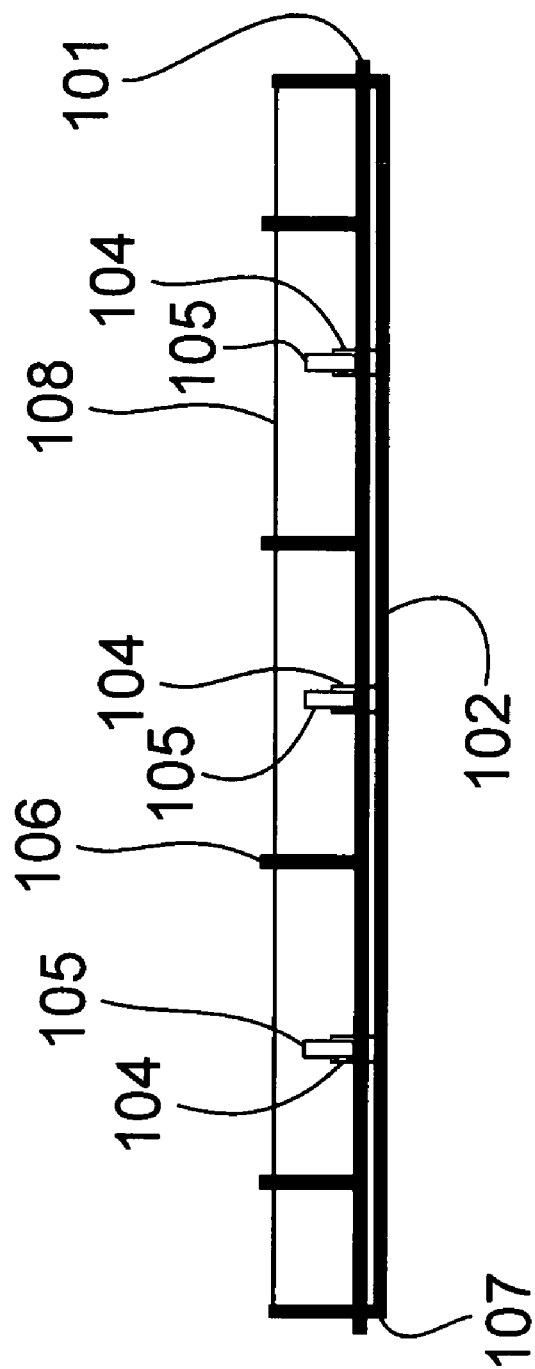

FIG. 10 is a bottom view showing the modified embodiment in locked position with the retaining pins in the brackets and the lugs extending through the cover.

Figure 11:
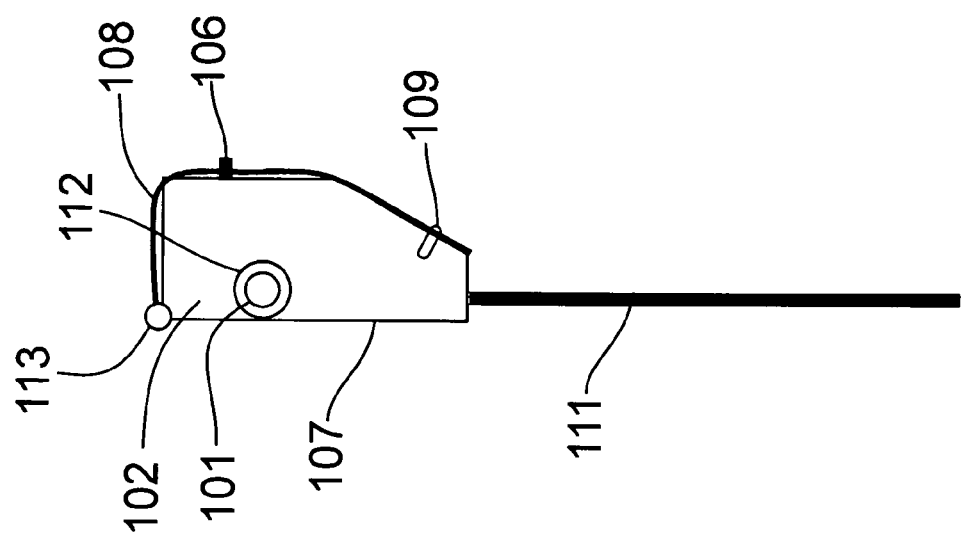

FIG. 11 is a side view of the modified embodiment showing the flap lugs extended in the holding position and the mud flap extending out from the hanger.

Figure 12:
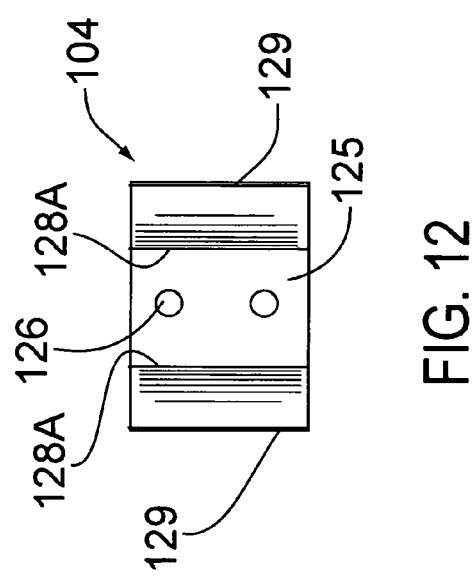

FIG. 12 is a front view of a retaining pin bracket for the modified embodiment.

Figure 13:
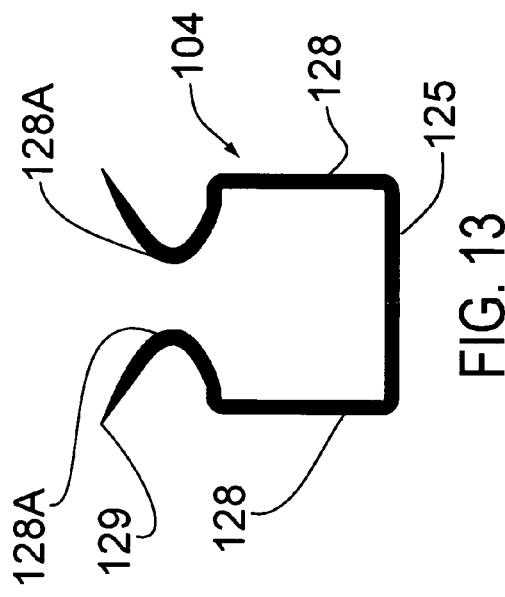

FIG. 13 is a top view of the retaining pin bracket for the modified embodiment.

Figure 14:
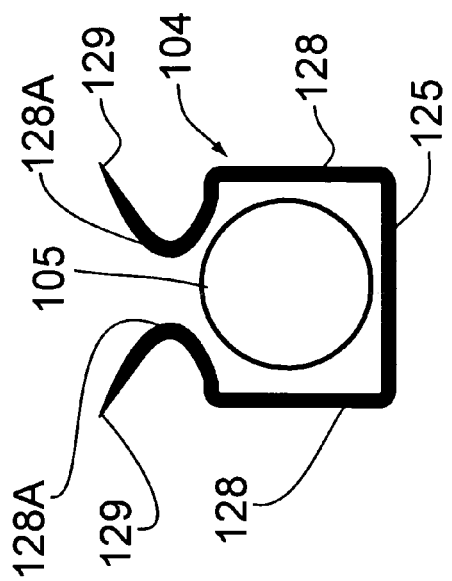

FIG. 14 is a view similar to FIG. 13 showing the retaining pin bracket with the retaining pin positioned therein.

DETAILED DESCRIPTION OF THE INVENTION

Referring to the drawings there is shown the releasing mud flap hanger 1 of the present invention which is designed to hold a mud flap 16. The mud flap 16 (FIG. 1) is supported by the flap lugs 5 on the releasing bar 4 of the present invention. The releasing hanger 1 has a main support plate 2 with a plurality of apertures 9 for fastening the releasing hanger to a structural member of a truck or trailer.

The support plate 2 has two sides 3 welded or otherwise attached thereto which are spaced apart a distance substantially equal to the width of the mud flap 16 and a top plate 10 which, preferably, is also attached thereto. As can be seen in FIGS. 2, 3, 4 and 5, the releasing bar 4 extends through holes in the sides 3 and is held in place with retaining washers 15 (FIG. 5), thereby allowing the releasing bar to rotate from the holding position (FIG. 2) to the releasing position (FIG. 3).

Figure 1:
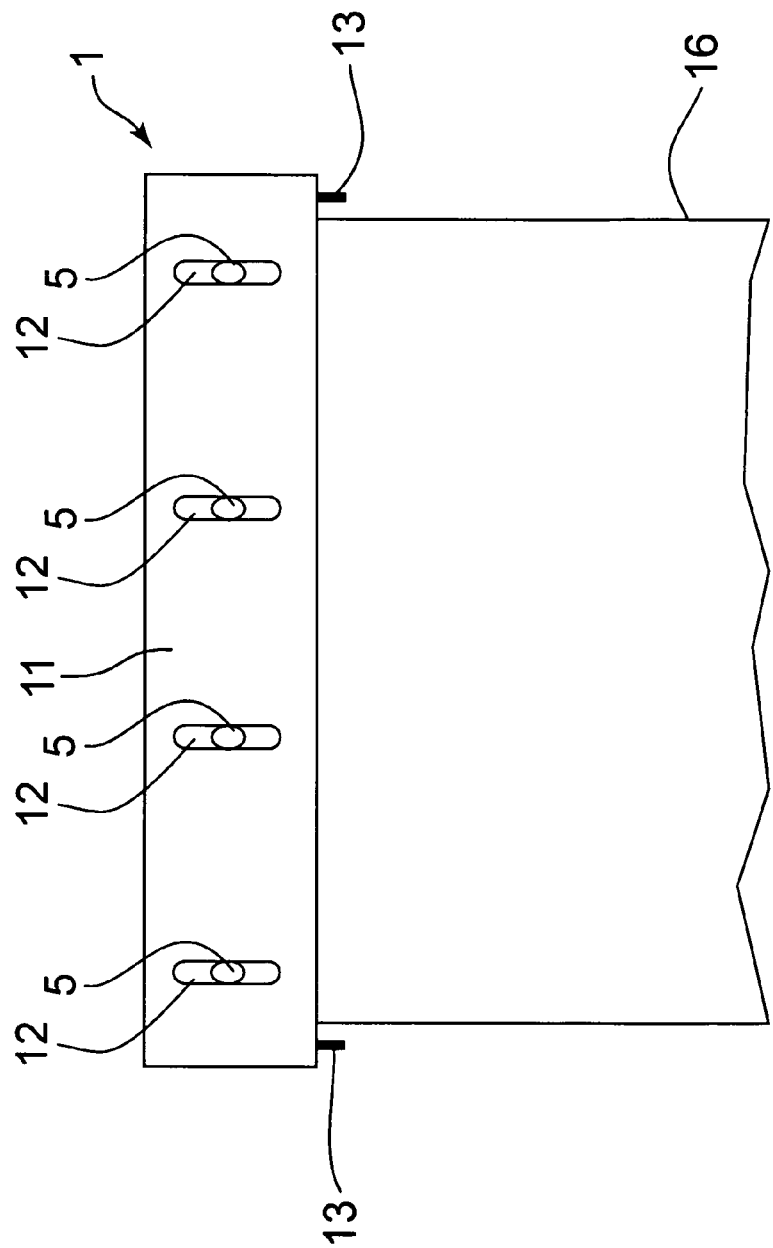
Figure 2:
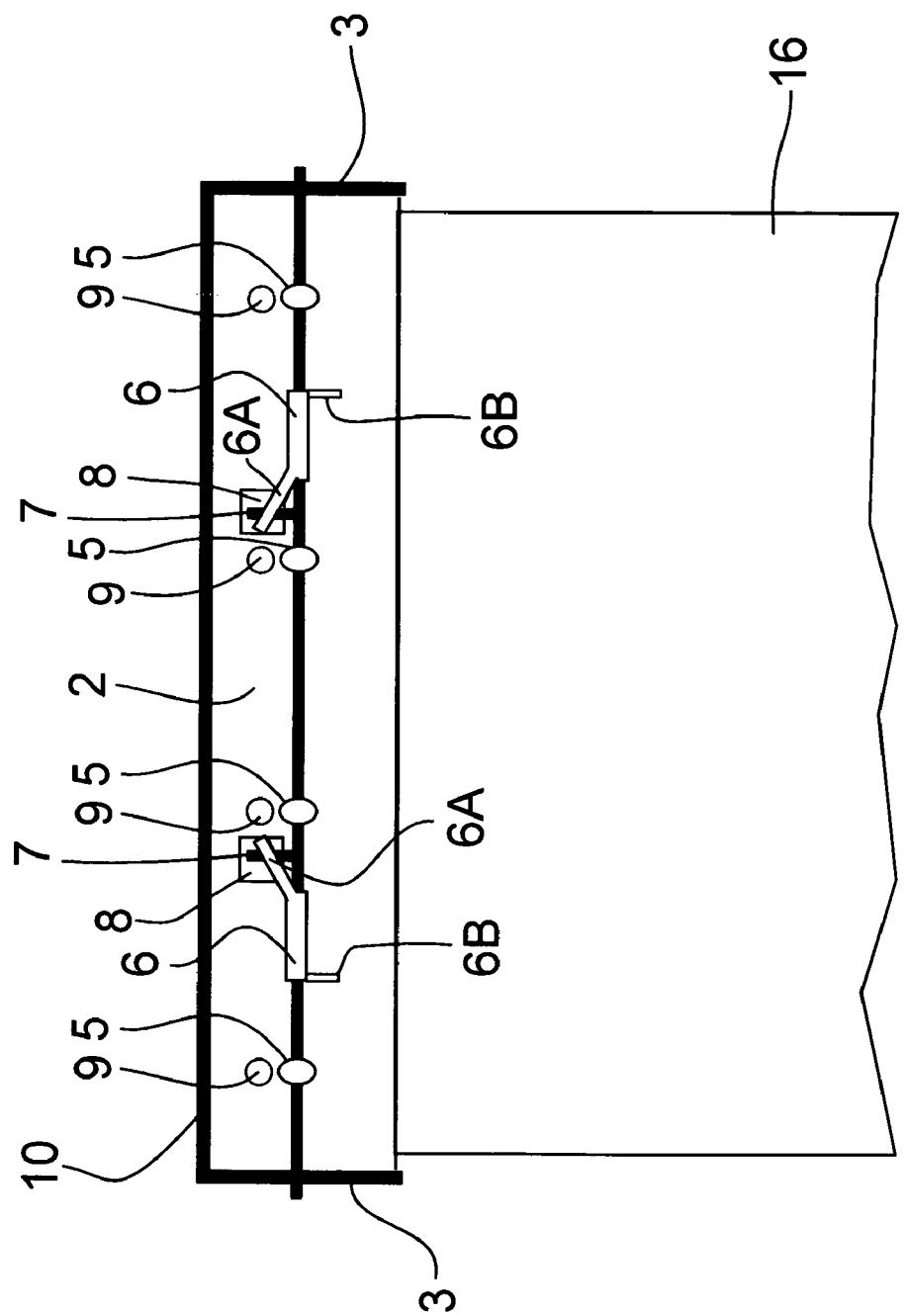
Figure 3:
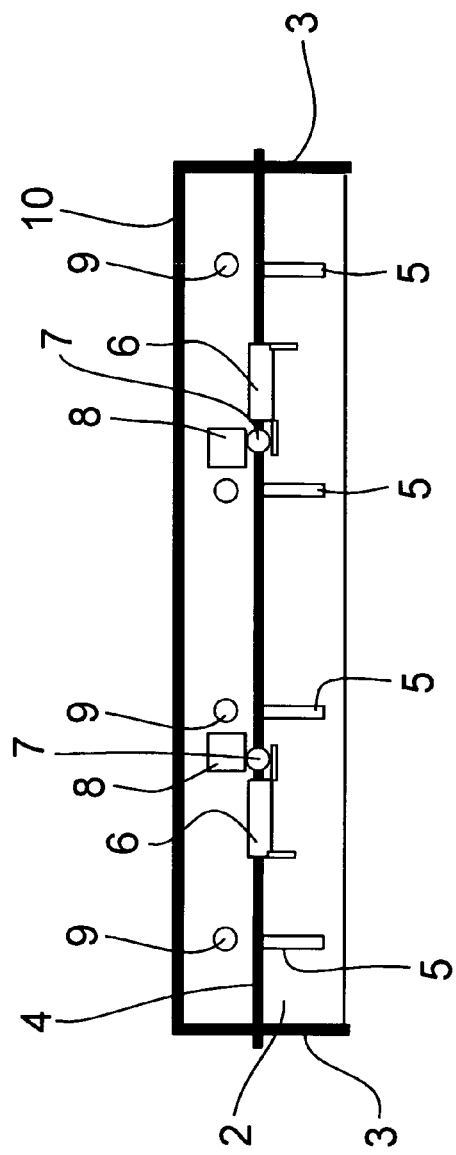
FIG. 3 is a view similar to FIG. 2 which shows the mechanism at the point of release where the pressure caused by the flap being lodged under the tire has brought the flap lugs to a downward vertical position thereby releasing the flap.

As can be seen most clearly in FIGS. 1, 2 and 3 there are four flap lugs 5 that are mounted on the releasing bar 4 in a spaced apart relationship conforming to the standard hole placement found on mud flaps 16. The flap lugs 5 may be welded on the releasing bar 4 or attached as threaded bolts into the releasing bar.

Two retaining pins 7 are also attached to the releasing bar 4. The retaining pins 7 are yieldingly held against retaining pin rests 8 by means of torsion springs 6. The retaining pin rests 8 are engaged to the support plate 2 by welding or other well known attachment means. Each torsion spring 6 encircles the releasing bar 4 and has a first end extension 6A in contact with and pushing the adjacent retaining pin 7 against its respective retaining pin rest 8 and a second end extension 6B in contact with the support plate 2. As can be seen in FIG. 2, when the flap lugs 5 are in the mud flap 16 support position extending outwardly from the support plate 2, the first end extension 6A is on the opposite side of the releasing bar 4 from the second end extension 6B. This assembly maintains the flap lugs 5 in a horizontal position for mounting and supporting the mud flap 16 unless and until a downward force acting on the mud flap 16 and, thus, on the flap lugs 5, overcomes the force of the torsion springs 6.

The torsion springs 6 are manufactured of heavy gage wire and are wound on the release bar 4 creating approximately 100 pounds pressure for each spring. Thus, the ends 6A of each spring 6 will be urging each retaining pin 7 against its respective pin rest 8 with a minimum force of 100 pounds. The force of the torsion springs 6 on the retaining pins 7 will maintain the flap lugs 5 in a generally horizontal position to support a mud flap 16 hanging downwardly therefrom, as best seen in FIG. 2.

Figure 4:
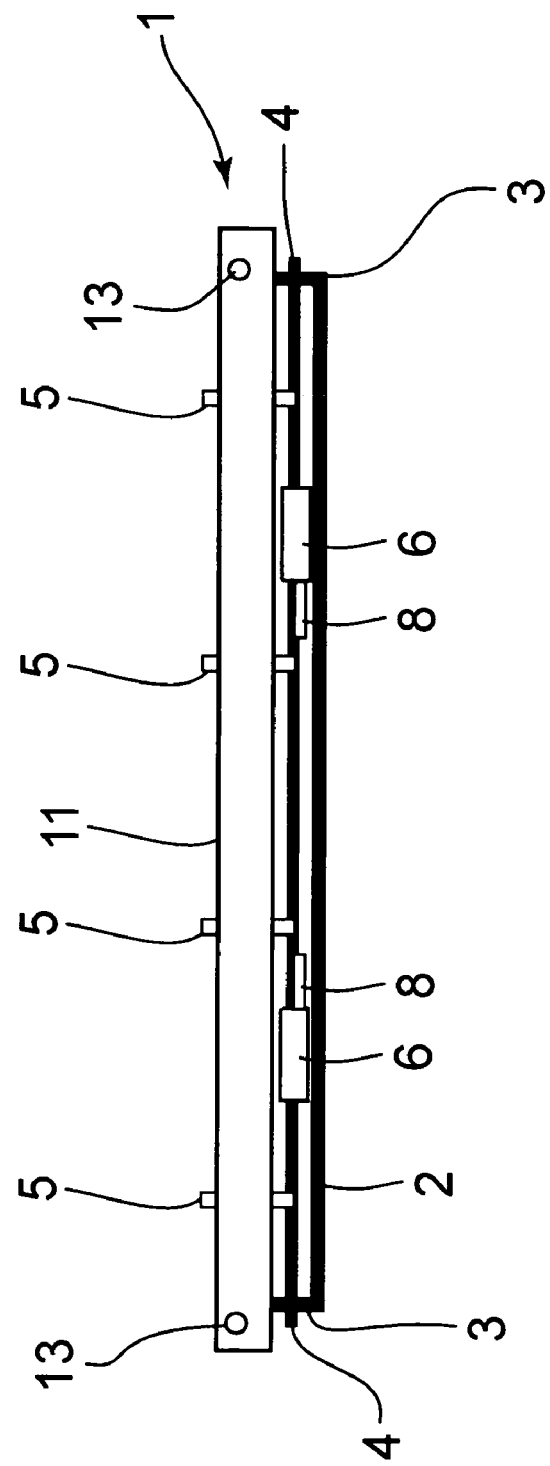
FIG. 4 is a bottom view showing the mechanism in the retracted position with the lugs in a horizontal position extending through the cover.
Figure 5:
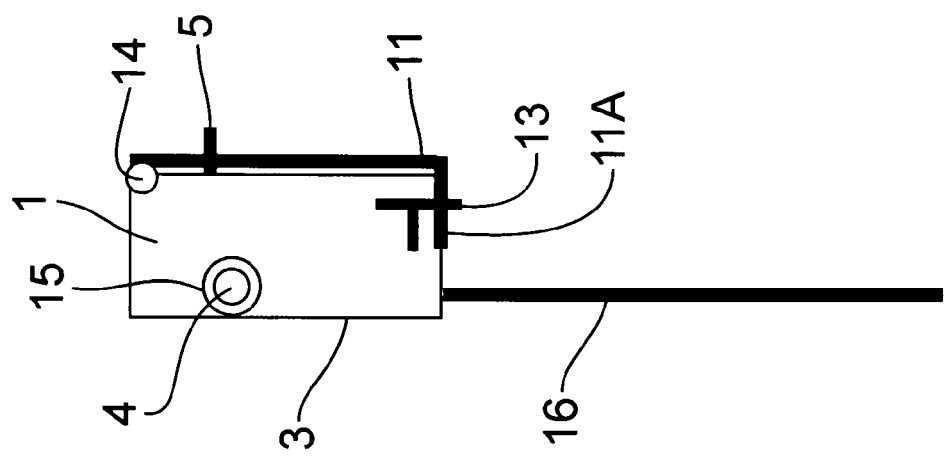
FIG. 5 is a side view showing the flap lugs extended in the retracted position and the mud flap extending out from the hanger.

There is a cover 11 attached to the top plate 10 by a hinge pin 14, as can be seen in FIG. 5. The cover 11 extends beyond the sides 3 by approximately one-half inch (see FIG. 4). As seen in FIG. 1, the cover 11 has four cover slots 12 that allow the flap lugs 5 to protrude through the cover 11 and has a leg 11A (see FIG. 5) at its lower end opposite the hinge 14, which leg is generally perpendicular to the front having the slots 12. If desired, the cover 11 could have a solid face without slots. As seen in FIG. 2 the cover 11 has been omitted in order to more clearly reveal the underlying components. The mud flap 16 is placed on the flap lugs 5 and the cover 11 is closed allowing the flap lugs 5 to protrude slightly through the slots 12 of the cover 11, thereby securing the mud flap 16 on the flap lugs 5 as best seen in FIGS. 1 and 4. The cover 11 is secured by sliding cover slide bolts 13 which are affixed to the sides 3 through holes in the leg 11A of cover 11 as seen in FIG. 5.

The force exerted on the retaining pins 7 by the torsion springs 6 will hold the retaining pins 7 against retaining pin rests 8 (FIG. 2) to hold retaining the flap lugs 5 in a generally horizontal position and thereby retaining the mud flap 16 in place, hanging downwardly therefrom through any normal driving conditions. When the mud flap 16 is subject to extreme force, such as when it becomes lodged between the tires of the vehicle and another surface, downward pressure will be exerted on the mud flap 16. This force will pull the flap lugs 5 in a downward direction and the torsion springs 6 will contract/tighten until the flap lugs 5 are in or close to a vertical downward position (FIG. 3). At that time, the mud flap 16 will release from the mud flap hanger 1 and fall to the ground, without damage to the mud flap 16 or the releasing mud flap hanger 1. Once the mud flap 16 has released from the mud flap hanger 1, the torsion spring 6, will retract causing the first end 6A of each spring 6 to return the retaining pins 7 to the respective retaining spring rests 8, thereby returning the release bar 4 to the holding/flap supporting position with the flap lugs 5 generally horizontal. At this point, the mud flap 16 is retrieved undamaged, the cover 11 is unsecured by releasing the cover slide bolts 13 and the cover 11 is raised. The mud flap 16 is replaced on the flap lugs 5 and the cover 11 is secured.

The spring rests 8 are mounted on the main support plate 2 and extend outwardly therefrom a short distance (on the order of ⅜") so that when the retaining pins 7 are in the upright, substantially vertical position shown in FIG. 2, the flap lugs 5 will be in a substantially horizontal position for supporting the mud flap 16.

Referring to FIGS. 6-14 there is shown another embodiment of releasing mud flap hanger 120 of the present invention which is designed to hold a mud flap 111. The mud flap 111 (FIGS. 9 and 11) is supported by the flap lugs 106 on the releasing bar 101 of the present invention. The releasing hanger 120 has a main support plate 102 with a plurality of apertures 103 for fastening the releasing mud flap hanger 120 to a structural member of a truck or trailer.

The support plate 102 has a pair of sides 107 which are spaced apart a distance substantially equal to the width of the mud flap 111. As can be seen in FIGS. 6, 7 and 11, the releasing bar 101 extends through holes in the sides 107 and is held in place with a retaining washer 112 (FIG. 11), thereby allowing the releasing bar to rotate from the holding position (FIG. 6) to the releasing position (FIG. 7).

As can be seen most clearly in FIGS. 6, 7 and 9 there are four flap lugs 106 that are mounted on the releasing bar 101 in a spaced apart relationship conforming to the standard hole placement found on mud flaps 111. The lugs 106 may be welded on the releasing bar 101 or cast as a unitary integral part of the releasing bar 101.

Three retaining pins 105 are also welded on or cast as a unitary integral part of the releasing bar 101. The flap lugs 106 are placed and held in a horizontal position by placing the retaining pins 105 into retaining pin brackets 104. The retaining pin brackets 104 are constructed of a flexible material that will allow legs of the bracket to expand to accept the retaining pins 105 and then contract to hold the retaining pins 105.

As shown in FIGS. 12-14, each retaining pin bracket 104 has a generally U-shaped cross section with a wall 125 having a pair of apertures 126 for receiving screws, rivets or other fastening devices for fastening the brackets to the support plate 102. Extending outwardly from the wall 125 are a pair of spaced apart legs 128 which are generally parallel to each other in the area close to the wall 125 and are contoured inwardly toward one another to define inwardly facing convexities 128A in the area adjacent the respective distal ends 129 of the legs 128.

The retaining pin bracket 104 is manufactured from spring steel or other resilient material with sufficient strength to releasably retain the retaining pin 105 therein while a mud flap 111 is supported on the flap lugs 106 during normal operation of a truck/trailer on the highway. As can be seen in FIG. 14, when there is no outward pressure on the legs 128, the distance between the respective inner surfaces at the innermost portions of convexities 128A is less than the diameter of the retaining pin 105. The distance between the respective legs 128 in the area adjacent the distal ends 129 and in the area adjacent the wall 125 is greater than the diameter of the retaining pin 105. Due to the resiliency of the material used to manufacture the retaining pin bracket 104, when the retaining pin 105 is moved from a position adjacent the distal ends 129 into contact with the wall 125, it will slide against the inner surfaces of the convexities 128A and urge the legs 128 apart to permit the retaining pin 105 to move to the retained position shown in FIG. 14. As a result of the resiliency of the retaining pin bracket 104, following insertion of the retaining pin 105 to the position shown in FIG. 14, the legs 128 will then move back toward one another so that the inwardly facing convexities 128A will retain the pin 105 in the position shown in FIG. 14 until such time as a force urging the pin 105 toward the distal ends 129 is sufficiently great as to spread the legs 128 apart a distance sufficient to permit the pin 105 to slide past the convexities 128A thereby releasing the pin 105. The distance between the respective convexities 128A at their closest points coupled with the strength of the retaining pin bracket 104 including its leg 128 is such that a force of at least 100 pounds would be required to remove a retaining pin 105 from a bracket 104. Upon release of the retaining pins 105 from their respective brackets 104, the flap lugs 106 are free to move from a generally horizontal supporting position to a generally vertical position at which the mud flap 111 will be released. As previously mentioned, this can happen when the mud flap becomes lodged between the tires of the vehicle and another surface.

With the releasing bar 101 in the locked position with the retaining pins 105 in the brackets 104 and the flap lugs 106 generally horizontal, a mud flap 111 is placed on the flap lugs 106.

As shown in FIG. 11, a cover 108 is connected to the support plate 102 by means of a hinge 113 (FIG. 11) mounted on the support plate 102. Following placing a mud flap 111 on the lugs 106, the cover 108 may then close over the assembly of the support plate 102 and the sides 107 such that the flap lugs 106 protrude through slots 110 in the cover 108. The mud flap is retained on the flap lugs 106. The cover 108, when closed may be secured to the support plate sides 107 by means of two cover clasps 109.

The mud flap 111 will remain secured within the releasing mud flap hanger 120 through all normal driving conditions. If significant pressure is applied to the mud flap, such as the mud flap 111 being caught between the rear wheels and the driving surface, the retaining pins 105 will release from the retaining pin brackets 104 thereby allowing the flap lugs 106 to fall downward to a generally vertical position and the release the mud flap 111 without damage to the mud flap 111 or the releasing mud flap hanger 120 or its retaining pin bracket 104.

The released mud flap 111 can be retrieved, the cover claps 109 released, the cover 108 lifted and the retaining pins 105 reset in the retaining pin brackets 104. At that point, the mud flap 111 can be replaced on the flap lugs 106 by simply shutting and clasping the cover 108 with the mud flap 111 back in position.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A mud flap holder comprising:
   (a) a support structure mountable on a truck or trailer, said support structure including a support plate;
   (b) a release bar supported by said support structure, said release bar extending along a longitudinal axis and having (A) a plurality of flap lugs extending outwardly from said axis and defining a first plane and (B) a plurality of retaining pins extending outwardly from said axis and defining a second plane generally perpendicular to said first plane, said release bar being rotatable from a first position at which said flap lugs extend in a direction outwardly from said support plate to support a mud flap to a second position at which said flap lugs extend generally downwardly to release a mud flap; and,
   (c) a retainer engaged to said retaining pins to yieldingly hold said release bar in said first position, and permitting rotation of said release bar to said second position upon a downward force on said flap lugs overcoming the resistance of said retainer.

2. A mud flap holder according to claim 1 wherein said retainer comprises a spring having a first end urging said retaining pin toward said support plate and a second end (A) engaging said support plate or (B) attached to said release bar, rotation of said release bar from said first position to said second position causing said spring to tighten.

3. A mud flap holder according to claim 2 wherein said spring first end is on the opposite side of said release bar from said second end when said flap lugs are in said first position.

4. A mud flap holder according to claim 2 further including retaining pin rests extending outwardly from said support plate and positioned to be engaged by said retaining pins when said release bar is in said first position.

5. A mud flap holder according to claim 2 wherein said spring first end urges said retaining pin toward said support plate with a force of at least 100 pounds.

6. A mud flap holder according to claim 1 wherein said retainer includes a retaining pin bracket engaged to said support plate and positioned to be engaged by a retaining pin when said release bar is in said first position, said retaining pin bracket having a pair of spaced apart legs (A) which define a socket in the area closest to said support plate larger than the diameter or lateral extent of said retaining pin and (B) which define a restriction in an area spaced from said support plate, said restriction being smaller than the diameter or lateral extent of said retaining pin, said legs being resiliently spreadable apart to permit the entrance of said retaining pin into said socket.

7. A mud flap holder according to claim 1 wherein said retainer includes a retaining pin bracket positioned to be engaged by a retaining pin when said release bar is in said first position, said retaining pin bracket having a wall engaged to said support plate and spaced apart legs extending outwardly from said wall in a direction away from said support plate, said legs, in the area adjacent said wall, being spaced apart a distance greater than the diameter or lateral extent of said retaining pin and, in an area spaced from said wall, being spaced apart a distance less than the diameter or lateral extent of said retaining pin, said legs being resiliently spreadable apart to permit the entrance of said retaining pin into the area adjacent said wall.

8. A mud flap holder according to claim 7 wherein said legs, in said area spaced from said wall, are curved toward each other such that the distance between said legs in the area closest to one another is less than the diameter or lateral extents of said retaining pin by an amount sufficient to retain a mud flap on said flap legs during normal use.

9. A mud flap holder according to claim 8 wherein, in the area further from said wall than said area closest to one another, said legs each extend to a distal end, the distance between said distal ends being greater than the diameter or lateral extent of said retaining pin.

10. A mud flap holder according to claim 7 wherein said legs, in said area spaced from said wall, are curved toward each other such that the distance between said legs in the area closest to one another is less than the diameter or lateral extents of said retaining pin by an amount which, coupled with the strength of said bracket, would require a force of at least 100 pounds to release a retaining pin from said bracket.

11. A mud flap holder comprising:
(a) a support structure mountable on a truck or trailer said support structure including a support plate;
(b) a release bar supported by said support structure, said release bar extending along a longitudinal axis parallel to said support plate and having a plurality of flap lugs extending outwardly from said axis, said release bar being rotatable from a first position at which said flap lugs extend in a direction outwardly from said support plate to support a mud flap to a second position at which said flap lugs extend generally downwardly to release a mud flap; and
(c) at least one spring yieldingly maintaining said release bar in said first position, said spring permitting rotation of said release bar to said second position upon a downward force on said flap lugs overcoming the resistance of said spring.

12. A mud flap holder according to claim 11 further including at least one retaining pin mounted on said release bar and wherein said spring has a first end urging said retaining pin toward said support plate and a second end (A) engaging said support plate or (B) attached to said release bar, rotation of said release bar from said first position to said second position causing said spring to tighten.

13. A mud flap holder according to claim 12 wherein said spring first end is on the opposite side of said release bar from said second end when said flap lugs are in said first position.

14. A mud flap holder according to claim 12 wherein at least two retaining pins are mounted on said release bar, said retaining pins lying on a first plane and said plurality of said flap lugs lying on a second plane substantially perpendicular to said first plane.

15. A mud flap holder according to claim 12 further including retaining pin rests extending outwardly from said support plate and positioned to be engaged by said retaining pins when said release bar is in said first position.

16. A mud flap holder according to claim 12 wherein said spring first end urges said retaining pin toward said support plate with a force of at least 100 pounds.

* * * * *